E. C. GARDNER &
E. A. HORSTKETTER
INVENTOR.

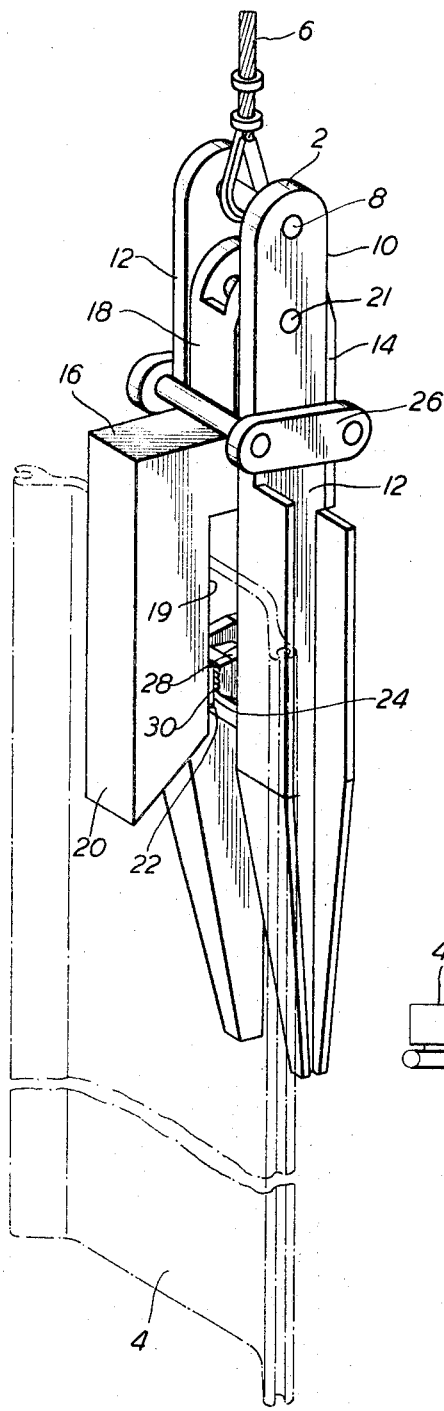
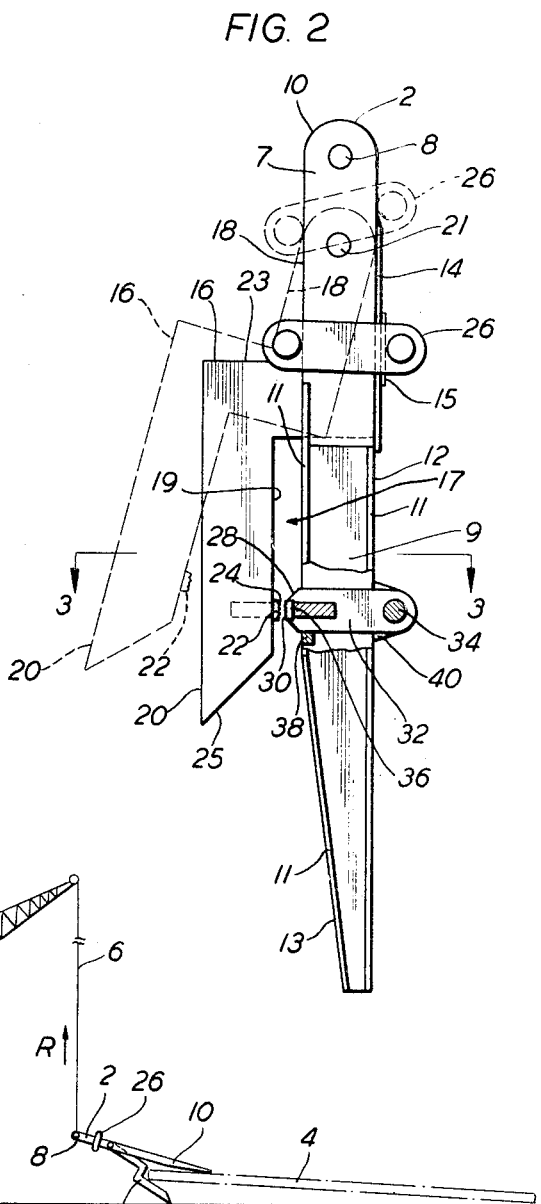
FIG. 1
FIG. 2
FIG. 5
E. C. GARDNER &
E. A. HORSTKETTER
INVENTOR.
BY Arnold, Roylance,
Kruger & Durkee
ATTORNEYS July 7, 1970　　　E. A. HORSTKETTER ET AL　　　3,519,305
HOISTING CLAMP Filed Feb. 26, 1968　　　2 Sheets-Sheet 2

BY Arnold, Roylance,
Kruger & Durkee
ATTORNEYS

United States Patent Office 3,519,305
Patented July 7, 1970

3,519,305
HOISTING CLAMP
Eugene A. Horstketter and Elmer C. Gardner, Houston, Tex., assignors to S.O.G. Research and Development Corporation, Houston, Tex., a corporation of Texas
Filed Feb. 26, 1968, Ser. No. 708,234
Int. Cl. B66c 1/48
U.S. Cl. 294—101                     6 Claims

ABSTRACT OF THE DISCLOSURE

This application discloses a hoisting clamp for gripping heavy sheet metal objects. In one exemplar embodiment, the clamp includes an elongated frame member, a jaw having a gripping surface disposed adjacent one end with the other end adapted for pivotal movement within the frame member, a locking ring to slip over the frame member and a portion of the jaw to hold the gripping surface in a closed position adjacent the frame, and a gripping member disposed within the frame member opposite the gripping surface of the jaw and adapted to pivot upwardly to allow entry of a sheet metal object into the space between the jaw gripping surface and the frame and to pivot downwardly upon frictionally engaging the sheet metal object for gripping the object between the two sets of gripping surfaces when the hoisting clamp is lifted.

BACKGROUND OF THE INVENTION

Sheet metal objects having straight, flat edges are commonly lifted and handled by various clamping devices attached to one edge of the sheet metal object. In lifting sheet metal piling commonly used in construction of temporary structures such as cofferdams and diversion dams, the gripping and lifting of the sheet metal piling sections, after their removal from the earth, is commonly done by means of a crane operated, manually-attached hook or clamping device. Very often the clamp or hook is manually attached by a construction worker riding the hoisting cable as the clamp or hook is lowered into position for gripping each piling section.

The commonly used manually-attached hooks and clamps are dangerous in that they require a construction worker to guide and place the hooks or clamps in their proper position and then they must be manually attached to the sheet metal piling section. Often the attachment of the hooks and clamps takes place 20 to 40 feet above ground level further increasing the danger of injury. In addition, when the sheet metal piling has been removed from its vertical position and moved to a horizontal position for storage, the hook or clamp must be manually removed from engagement with the piling sections before another piling may be engaged and lifted. Once the pilings have been placed in a horizontal position they are difficult to handle because of their weight, and the removal of the clamps or hooks is a real problem. Prior art lifting hooks or clamping devices that include various releasing means have a tendency to bind during removal and a large horizontal force is necessary to disengage the clamp from the end of the sheet metal piling section. It can be seen that a substantial amount of time is employed in manually attaching and detaching a lifting hook or clamping device from each sheet metal piling section, especially when great numbers of such piling sections are being handled as in the case in large construction operations.

Accordingly, the disadvantages of the prior art are overcome by the present invention and a novel hoisting clamp is provided that is self-attaching to a sheet metal object and which may be safely and easily removed once the sheet metal object has been laid in a horizontal position.

SUMMARY OF THE INVENTION

In accordance with this invention, a hoisting clamp is provided having an elongated frame member and a Z-shaped jaw with one end pivotally disposed within the frame member to allow the free end of the jaw member to be rotated towards the frame member to a closed position defining a narrow space between the frame and jaw members into which one end of a sheet metal piling section is urged. A slip-ring, encircling the frame member, slides downwardly over the end of the jaw member pivotally disposed within the frame when the jaw member is closed to lock the jaw in its closed, spaced-apart relationship with the frame member. A means for holding the sheet metal piling section between the elongated frame member and Z-shaped jaw member is provided that securely retains the sheet metal piling section as it is being lifted and moved.

When the sheet metal piling section is placed in a horizontal position, and the slip-ring is manually moved to a position above the pivot point of the Z-shaped jaw, a vertical lifting force applied to the frame member by a hoisting cable will allow the jaw member to rotate away from the frame member and release the end of the sheet metal piling section. As soon as the hoisting clamp is lifted into a vertical position, the Z-shaped jaw again closes to a closely spaced-apart relationship with the frame member and the slip-ring falls into place locking the frame and jaw member in their closed position. The housing clamp is now prepared to engage and grip another sheet metal piling section without the need for manual manipulation or attachment of the clamp.

Accordingly, the primary feature of the present invention is the ability of the hoisting clamp to grasp a large, heavy sheet metal object without the need for manual attachment of the clamp to the object.

Another feature of the present invention is that the hoisting clamp may be removed from a sheet metal object without any tendency of the clamp to bind the sheet metal object or the necessity of any large horizontal force to remove the clamp.

Another feature of the present invention is the simplicity and speed with which the hoisting clamp may be attached to a vertical sheet metal piling section and disengaged from the piling section once it has been placed in a horizontal position.

DESCRIPTION OF THE DRAWINGS

The aforementioned features of the present invention will be apparent from the following detailed description wherein reference is made to figures in the accompanying drawings, which drawings form a part of and are incorporated by reference as a part of the specification.

In the drawings:

FIG. 1 is a pictorial view of a hoisting clamp according to one embodiment of this invention.

FIG. 2 is a detail view partly in cross section, of the embodiment of the hoisting clamp illustrated in FIG. 1.

FIG. 5 is a pictorial view of a hoisting clamp according to one embodiment of this invention shown releasing a sheet metal object.

DETAILED DESCRIPTION OF THE PREFERRED EMBODIMENTS

Figure 3:
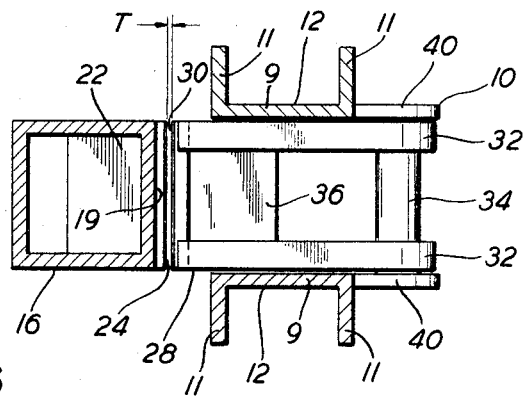
FIG. 3 is a cross-sectional view of a hoisting clamp according to one embodiment of this invention taken along lines 3—3 of FIG. 2.

With reference to FIG. 1, a hoisting clamp according to one embodiment of the present invention is shown. Hoisting clamp 2 is shown gripping a sheet metal piling section 4 as clamp 2 is being lifted by a crane (not shown) via a hoist cable 6 conventionally attached to lifting pin 8 of clamp 2. Hoisting clamp 2 comprises a frame member 10 having two elongated spaced-apart channel members 12 structurally held in the spaced-apart relationship by a brace plate 14. A Z-shaped jaw member 16 has a pivot end 18 disposed between the spaced-apart channel members 12 and rotatable about pivot pin 21. The free end 20 of a jaw member 16 has, on its inner surface 19 facing frame member 10, a gripping bar 22 having a serrated gripping surface 24. Disposed between the spaced-apart channel members 12 is a gripping member 28 having a serrated gripping surface 30. Sheet metal piling section 4 is held in place by the action of the serrated gripping surfaces 24 and 30 frictionally engaging opposite surfaces of the piling. Slip-ring 26 slides over the upper portion of channel member 12 and pivot end 18 of jaw 16 to hold the movable member 16 in its closed position as shown in FIG. 1.

Referring now to FIG. 2, a detailed view, partly in cross-section, of the hoisting clamp illustrated in FIG. 1 may be seen. Channel sections 12 of frame member 10 include an upper reinforced arm 7 and a lower channel portion 9 having flanged surfaces 11. The lower surface 13 of flange 11 is angled as shown to help guide the edge of the sheet metal piling upwardly along surface 13 of flanges 11. Z-shaped jaw 16 is shown in its closed position for defining a generally rectangular space 17 between the interior surface 19 of jaw 16 and the surfaces of flanges 11 of the channel sections 12 comprising the frame 10. Disposed in the inner face 19 of jaw 16 is a gripping bar 22 having disposed on its outer face a serrated gripping surface 24. When jaw member 16 is in its closed position slip-ring 26 slides downwardly over frame member 10 and the pivot end 18 of jaw member 16 until slip-ring 26 is restrained from further downward movement by surface 23 of jaw member 16. When hoisting clamp 2 is in its vertically oriented lifting position, as shown in FIG. 2, slip-ring 26 is held in place by the force of gravity and restrains jaw pivot end 18 within the space between the spaced-apart channel members 12 (see FIG. 1). A built up reinforcing surface 15 is shown applied to the outer surface of bracing plate 14 to provide a suitable reinforcing surface to prevent excessive wear by slip-ring 26 on the exposed surface of brace plate 14 when jaw member 16 is locked in its closed position as illustrated. Of course, locking of the members could be just as effectively accomplished by means of a C-shaped link engaging the channel member 12 and end 18 of member 16.

Gripping member 28 is shown disposed between the spaced-apart channel members 12 of frame 10 to provide a gripping surface opposite gripping surface 24 of jaw member 16. Gripping member 28 includes two spaced-apart arm members 32 between which are mounted a bar 36 terminating in an exposed gripping surface 30 to oppose gripping surface 24 of the jaw member 16. Arms 32 of member 28 are rotatably mounted in the space between the spaced-apart channel sections 12 of frame member 10 by means of a pivot pin 34 carried by two extensions 40 protruding from the rear surfaces of channels 12. A stop 38 is disposed between spaced-apart channels 12 to provide a means of contacting and stopping the downward rotational movement of gripping member 28. When the lower portion of arm members 32 contact stop 38 the gripping surfaces 30 are directly opposite the gripping surfaces 24 of jaw member 16.

By moving slip-ring 26 above pin 21 to the position shown by the dotted lines, pivot end 18 is no longer restrained within the opening between the spaced-apart channel sections 12 of frame member 10 and is free to rotate outwardly as indicated in FIG. 2. However, when hoisting clamp 2 is in the vertical lifting position as shown in FIG. 2, jaw member 16 will rotate downwardly to its closed position. Slip-ring 26 will then slide downwardly over the upper reinforced portion 7 of channels 12 and encircle frame member 10 and pivot end 18 to restrain jaw member 16 from outward rotational movement.

Built-up surface 15, hereinbefore described, performs another function, that of providing a means of initially relieving the restraining force exerted by ring 26 on member 16. When gripping a sheet metal piling, the lateral force exerted by the downward pivotal movement of member 28 forces jaw 16 to deflect outwardly to a small degree. Outward movement of jaw 16 is restrained by ring 26 which is tightly wedged between end 18 and the surface 15. When releasing the clamp, ring 26 is forced upwardly to ride over the edge of surface 15 which allows ring 26 to move toward jaw 16 by the thickness of built-up surface 15. This relieves the deflection force acting on jaw 16, and lowers the frictional restraining force acting outwardly on ring 26, thus requiring a smaller upward force to move ring 26 upwardly over pivot pin 21.

Referring now to FIG. 3, a detailed cross-sectional view of the gripping member of a hoisting clamp according to one embodiment of this invention is shown. Channel members 12 are shown in their spaced-apart relationship, with extensions 40 extending from the rear surfaces of channel sections 12. Gripping member 28, including spaced-apart arms 32, is shown disposed between the spaced-apart channels 12 and rotatably mounted by means of a pivot pin 34 fixed between the spaced-apart extensions 40. A bar 36 is disposed between the movable ends of arms 32 and terminates in a gripping surface 30 having parallel, serrated ridges. Jaw member 16 is shown in cross section and spaced opposite the opening between the spaced-apart channel members 12, as it would be in its closed position as shown in FIG. 2. A jaw gripping bar 22 is shown in FIG. 2. A jaw gripping bar 22 is shown disposed within jaw 16 and protruding beyond inner surface 19 to provide a gripping surface 24 having parallel serrated ridges similar to the gripping surface 30 hereinbefore described. With jaw 16 in its closed position and gripping surface 30 opposite gripping surface 24, it has been found that a spacing gap of one-eighth inch, as indicated at T, conveniently provides sufficient flexibility for handling various thicknesses of sheet piling.

The hoisting clamp may be constructed of steel channel and flat steel stock. The overall length of such a hoisting clamp for handling sheet metal pilings has conveniently been found to be on the order of five feet with the Z-shaped jaw having a convenient length of approximately three feet. Of course, various materials may be used in the construction of the hoisting clamp and other comparative sizes of the members may be employed without departing from the scope of the invention disclosed herein.

Figure 4:
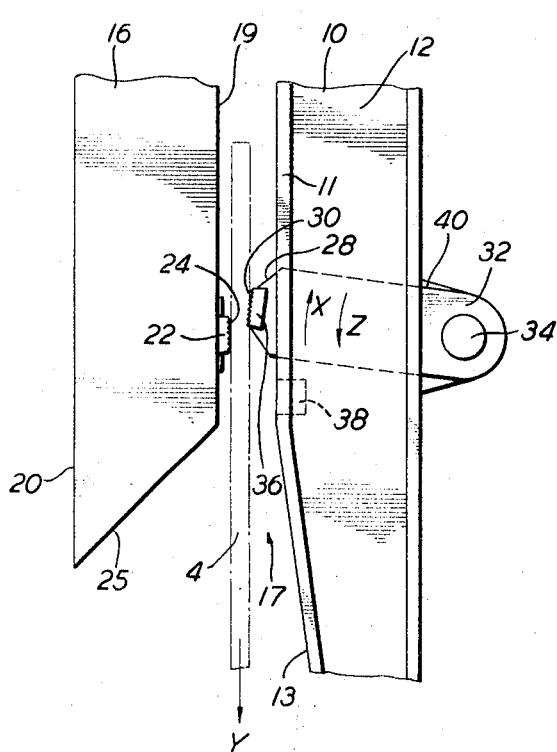
FIG. 4 is a detailed view of the retaining means employed in one embodiment of the present invention.

FIG. 4 is a detailed view of the gripping action employed by one embodiment of the present invention to grip and hold a sheet metal piling section while the hoisting clamp is being lifted. The free moving end 20 of jaw 16 is shown in its closed position with inner surface 19 generally parallel to the inner flanged surfaces of channel members 12 to define a space 17 between frame member 10 and jaw member 16. Gripping bar 22 with its exposed serrated gripping surface 24 is shown oriented facing the surface of flanges 11 of channels 12, and engaging one surface of a sheet metal piling section 4. Rotatable gripping means 28 is shown with its serrated gripping face 30 in contact with the opposite side of sheet metal piling 4.

Referring now to FIGS. 1, 2 and 4, with the slip-ring 26 in its lower position and jaw 16 in its closed and locked position (see FIG. 2) when hoisting clamp 2 is lowered to engage a sheet metal piling 4, slanted surface 13 of frame 10 and slanted surface 25 of jaw 16 will contact and guide the upper edge of the piling section into the space 17 between jaw 16 and frame 10. As the sheet piling 4 slips into space 17, it slides over gripping surfaace 24 of jaw 16 while simultaneously contacting gripping surface 30 of rotatable gripping member 28, causing gripping member 28 to pivot upwardly about pivot pin 34 in the direction shown by the arrow X, and allowing the unhindered entrance of piling 4 into space 17. When the hoisting clamp is lifted, gravity acting on piling 4 causes it to move downwardly, through space 17, as indicated by arrow Y and causes frictional engagement between serrated gripping surface 30 and the other side of sheet piling 4. Gripping member 28 is pivoted downwardly, in the direction shown by the arrow Z, until the piling section 4 is wedged between and tightly gripped by the gripping surfaces 24 and 30. Further, lifting of the hoisting clamp causes piling section 4 to tend to slide additionally in the direction indicated by the arrow Y, thereby further engaging gripping surface 30 and causing member 28 to tend to further rotate downwardly, in the direction of the arrow Z, until the metal pile 4 is locked between the gripping surfaces 24 and 30 of the hoisting clamp and held in such a clamped position by the weight of the sheet metal piling. The hoisting clamp may now be lifted and in turn lift the sheet metal pile 4 and move it to any other desired location.

In FIG. 5, an embodiment of the hoisting clamp according to this invention is shown releasing a sheet metal object after it has been placed in a horizontal position. Crane 45 is shown with one end of its cable 6 attached to the hoisting pin 8 of clamp 2 for applying a vertical force, indicated by the arrow at R, to the clamp for removing it from engagement with the sheet metal pile 4. The piling 4 is shown still partly retained between frame 10 and jaw 16 with ring 26 in its upper position to release jaw 16 for pivotal movement.

Referring now to FIG. 1, 2 and 5, when the sheet metal pile lifted and then lowered to assume a horizontal attitude so that the sheet piling section 4 is resting on the ground or any other appropriate surface with hoisting clamp 2 in a horizontal attitude, and the Z-shaped jaw 16 beneath the pile as shown in FIG. 5, the clamp may be released by manually moving a slip-ring 26 from its lowest locked position, as shown in FIG. 2, to its upper position above pivot pin 21, as shown by the dotted lines in FIG. 2. Slip-ring 26 may conveniently be released by a workman striking the ring with a hammer. If the cable 6, attached to the hoisting pin 8, is now raised vertically, the weight of the sheet piling 4 will cause the Z-shaped jaw 16 to pivot away from frame member 10, thus releasing the piling section 4 which will slide from between the jaws of the partially raised hoisting clamp, as shown in FIG. 5. As soon as the hoisting clamp has been lifted or raised to a vertical position, the Z-shaped jaw 16 will again pivot downwardly toward frame member 10 and allow slip-ring 26 to fall over the jaw pivot end 18 and lock jaw 16 in its closed relationship to frame 10. Hoisting clamp 2 is again ready to be dropped over the top edge of another sheet metal piling 4 to repeat the clamping and lifting process.

Figure 6:
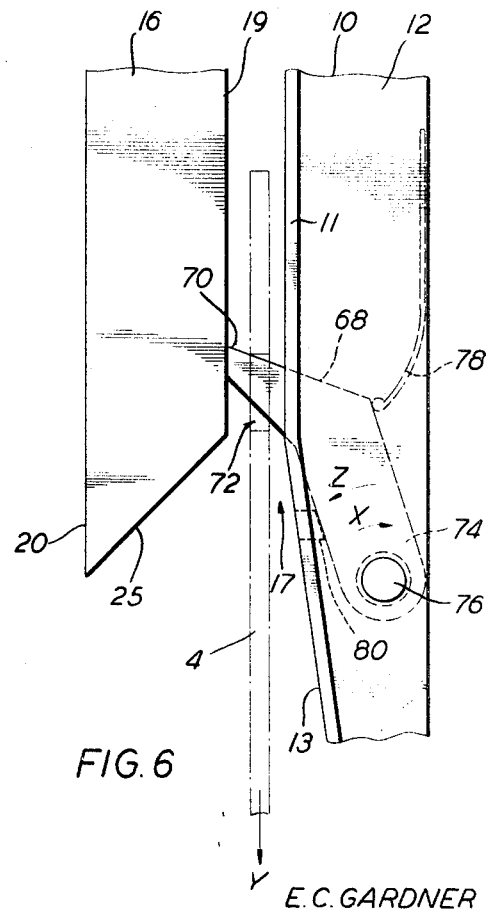
FIG. 6 is a detailed view of the retaining means employed in another embodiment of the present invention.

Referring now to FIG. 6, a detailed view of the gripping means employed in another embodiment of the present invention is shown. In this embodiment, the Z-shaped jaw 16 does not have a gripping bar 22 or any gripping surfaces 24. A retaining member 68, having a shank end 74 rotatably disposed between channel sections 12 and having a finger-like projecting tip 70, is biased to rotate in the direction indicated by the arrow Z by a spring 78. Retaining member 68 is free to rotate until tip 70 strikes the inside surface 19 of jaw 16 when jaw 16 is in its closed position as hereinbefore discussed. If the jaw 16 is open, and not in its closely spaced relation to frame 10, retaining member 68 will be free to pivot downwardly in the direction indicated by the arrow Z until it strikes stop bar 80 mounted between parallel channel members 12.

Referring now to FIGS. 1, 2 and 6, as hereinbefore described when slip-ring 26 is in its lower locking position restraining jaw 16 from outward rotational movement and holding its inner surface 19 in the spaced-apart relationship to the inner surfaces of flanged channels 12, the hoisting clamp 2 is prepared to engage and lift sheet metal piling sections 4. With jaw 16 in its locked position, retaining member 68 will be biased in the direction indicated by the arrow Z by spring 78 with tip 70 contacting inner surface 19. When hoisting clamp 2 is lowered over the top edge of a vertical metal piling 4 the top edges of the metal piling contact slanted surfaces 13 and 25 of channel members 12 and jaw 16, respectively, guiding the top edge of the piling 4 into the space 17 between jaw 16 and frame 10. As the hoisting clamp is further lowered over the top edge of the metal piling 4, the top edge of the piling 4 contacts the lower side of the finger-like tip 70 and urges retaining member 68 against the bias provided by spring 78 causing member 68 to rotate rearwardly about pivot pin 76, as indicated by arrow X. The top edge of the sheet metal piling 4 then slips past the tip 70 of the retaining member 68 into the space 17 until finger-like tip 70 of retaining member 68 slips through a slotted aperture 72 until it contacts inner surface 19 of jaw 16. Once tip 70 is inserted through aperture 72 in piling 4, the hoisting clamp 2 may be lifted and the piling 4 will be engaged by the finger-like tip 70 of retaining member 68. The weight of piling 4 acts downwardly as indicated by arrow Y forcing member 68 in the direction indicated by Z and locking member 68 in place with tip 70 contacting surface 19 of jaw 16 to support piling section 4.

To release the sheet metal piling section 4, once it has been placed in a horizontal position, the same procedure is followed as hereinbefore described for the previous embodiment of the hoisting clamp. Slip-ring 26 (see FIGS. 2 and 5), is manually moved from its locked position to a position above pivot pin 21, as shown in FIGS. 2 and 5, allowing the Z-shaped jaw 16 free outward pivotal movement. Then as a vertical lifting force is applied to hoisting clamp 2 through hoisting cable 6, as seen in FIG. 5, jaw 16 is free to swing outwardly allowing retaining member 68 to rotate downwardly until it contacts stop 80. As clamp 2 is hoisted, as seen in FIG. 5, frame member 10 will rotate upwardly and withdraw tip 70 from aperture 72 thus releasing piling section 4.

After release of the piling section, jaw 16 will swing down to its closed position in a spaced-apart relationship to frame 10 due to gravitational force and slip-ring 26 will slide down to its locking position once again to restrain jaw 16 from outward rotational movement. Retaining member 68 will be again disposed between jaw 16 and frame 10 with tip 70 contacting inner jaw face 19 and prepared to accept and lock another piling section. Of course, stop 80 could be constructed of a suitable material and a predetermined load strength to carry the load of the sheet pile 4 without having tip 70 of member 68 contacting inner surface 19. Further, it may be seen that stop 80 is not essential and member 68 may be allowed to rotate downwardly to a vertical position. However, this would necessitate having to manually reset member 68 to its biased position each time clamp 2 is closed with a corresponding loss of time.

The embodiments of the present invention, hereinbefore described, are directed to gripping a sheet metal object, such as a sheet metal piling, that has a straight flat edge and gripping surface, or a retaining aperture. However, the clamp could just as easily grip and retain a sheet metal object having a flanged or rimmed edge by utilizing detents on the jaw 16 and inner surface of frame 10 that will retain the sheet metal object by its larger edge section. Further, a multiple-gripping hook could be constructed by horizontally ganging multiples of the hereinbefore described clamps. Such a ganged hoisting clamp would be useful in lifting very heavy sheet metal objects without the necessity of increasing the size of the clamp members to gain greater load carrying capacity.

Numerous variations and modifications may obviously be made in the structure herein described without departing from the scope of the present invention. Accordingly, it should be clearly understood that the forms of the invention described herein and shown in the figures in the accompanying drawings are illustrative only and are not intended to limit the scope of the invention.

What is claimed is:

1. A hoisting clamp for lifting sheet metal piling sections, comprising
    an elongated frame having a slotted opening through a substantial longitudinal portion thereof,
    a Z-shaped jaw member having first and second extending ends protruding in opposite directions, said first end of said jaw member being pivotally disposed within said slotted opening of said frame for allowing said second end of said jaw member to be pivoted between a closed position adjacent said frame member and an open position spaced therefrom,
    retaining means cooperating with said jaw member for holding the sheet metal piling in the space between said second end of said jaw member and said frame while the sheet metal piling is lifted, and
    a slip ring slideable over the upper portion of said frame member and said first end of said Z-shaped jaw member for restraining outward pivotal movement of said jaw member while the sheet metal piling is lifted.

2. A hoisting clamp for lifting sheet metal piling sections, comprising
    a pair of channel sections fixed in a spaced-apart relationship for defining a substantially rectangular space between said channel sections,
    a first pin passing laterally through one end of said spaced-apart channel sections for supporting said sections in a spaced apart relationship and providing a means of attaching a hoisting cable,
    a second pin passing laterally through said one end of said spaced-apart channel sections intermediate said first pin and the other end of said sections,
    a Z-shaped jaw member having first and second extending ends, protruding in opposite directions, said first end of said jaw member being pivotally disposed within said space between said channel sections and mounted for pivotal movement on said second pin for allowing said second end of said jaw member to be pivoted between a closed position adjacent said pair of channel sections and open position spaced therefrom,
    retaining means cooperating with said jaw member for holding the sheet metal piling in the space between said second end of said jaw member and said frame while the sheet metal piling is lifted, and
    a slip ring slideable over the upper portion of said frame member and said first end of said Z-shaped jaw member for restraining outward pivotal movement of said jaw member while the sheet metal piling is lifted.

3. The hoisting clamp as described in claim 1, wherein said frame member comprises
    a pair of channel sections fixed in a spaced-apart relationship for defining a substantially rectangular space between said channel sections,
    a first pin passing laterally through one end of said spaced-apart channel sections for supporting said sections and providing a means of attaching a hoisting cable, and
    a second pin passing laterally through said one end of said spaced-apart channel sections intermediate said first circular pin and the other end of said sections for providing pivotal attaching means for said first end of said Z-shaped jaw member.

4. The hoisting clamp as described in claim 3, wherein said retaining means comprises
    a gripping surface disposed adjacent the second end of said Z-shaped jaw member and oriented to face said frame member for gripping one surface of the sheet metal object, and
    an elongated gripping member having one end pivotally disposed in the space between said spaced-apart channel sections of said frame member and having a gripping surface adjacent the other end, said gripping surface frictionally engaging the other surface of the sheet metal object for causing said gripping member to pivot downwardly and wedging the sheet metal object between the gripping surfaces of said jaw member and said gripping member.

5. The hoisting clamp as described in claim 3, wherein said retaining means comprises
    a retaining member having one end pivotally disposed within the space between said channel sections of said frame member and having a finger-shaped other end projecting therefrom, and
    a spring to pivotally bias said finger-shaped other end toward said second end of said jaw member for insertably engaging an aperture in the sheet metal object urged into the space between said jaw and frame members, said finger-shaped end of said retaining member contacting said second end of said jaw member to prevent further pivotal movement of said retaining member for holding the sheet metal object while said clamp is lifted.

6. The hoisting clamp as described in claim 3, wherein said retaining means comprises
    a flange adjacent the second end of said Z-shaped jaw member and projecting inwardly toward said frame member, and
    a flanged member disposed on the inner surfaces of said frame member and projecting outwardly therefrom to oppose said flange adjacent the second end of said Z-shaped jaw member and spaced therefrom when said jaw member is in the closed position for engaging the flanged rim of a sheet metal object and preventing its release when said clamp is hoisted.

References Cited

UNITED STATES PATENTS 1,312,926    8/1919    Sherman.
3,300,242    1/1967    Renfroe _____ 294—101

OTHER REFERENCES

German application DAS 1,108,876, June 1961.

GERALD M. FORLENZA, Primary Examiner

G. F. ABRAHAM, Assistant Examiner

U.S. Cl. X.R.

294—104